(12) United States Patent
Ratliff et al.

(10) Patent No.: US 12,507,669 B2
(45) Date of Patent: Dec. 30, 2025

(54) ANIMAL FEEDER

(71) Applicants: Gary Ratliff, Victorville, CA (US); Rosalinda Ratliff, Victorville, CA (US)

(72) Inventors: Gary Ratliff, Victorville, CA (US); Rosalinda Ratliff, Victorville, CA (US)

( * ) Notice: Subject to any disclaimer, the term of this patent is extended or adjusted under 35 U.S.C. 154(b) by 162 days.

(21) Appl. No.: 17/676,389

(22) Filed: Feb. 21, 2022

(65) Prior Publication Data
US 2022/0264842 A1   Aug. 25, 2022

Related U.S. Application Data

(60) Provisional application No. 63/152,265, filed on Feb. 22, 2021.

(51) Int. Cl.
*A01K 5/01* (2006.01)

(52) U.S. Cl.
CPC .................................. *A01K 5/0114* (2013.01)

(58) Field of Classification Search
CPC ... A01K 1/10; A01K 5/00; A01K 5/01; A01K 5/0114; A01K 5/0135; A01K 7/00; A01K 7/005; A01K 39/014; A01M 25/002; A01M 31/008; A47F 7/0014; A47F 7/0042; A47F 7/14; A47F 7/145; B44D 3/121; B44D 3/126; B44D 3/128
USPC ........ 119/61.5; 220/570; D30/121, 122, 129, D30/130, 132
See application file for complete search history.

(56) References Cited

U.S. PATENT DOCUMENTS

| | | | | |
|---|---|---|---|---|
| 2,827,648 | A | * 3/1958 | Geisz | B44D 3/128 401/121 |
| 3,292,815 | A | * 12/1966 | Smith | B44D 3/128 220/570 |
| D211,611 | S | * 7/1968 | Fox, Jr. et al. | D32/53.1 |
| 3,837,034 | A | * 9/1974 | Leffert | B44D 3/123 220/570 |
| D244,948 | S | * 7/1977 | Foley | D30/130 |
| 4,800,845 | A | 1/1989 | Budd | |
| 4,976,222 | A | * 12/1990 | Cooke | A01K 5/01 119/60 |
| 5,082,140 | A | * 1/1992 | Swenson | A47G 19/02 426/115 |

(Continued)

FOREIGN PATENT DOCUMENTS

| | | | | |
|---|---|---|---|---|
| CN | 104365498 | B | 11/2016 | |
| CN | 107683779 | A | * 2/2018 | ........... A01K 5/0114 |

(Continued)

*Primary Examiner* — Kimberly S Berona
*Assistant Examiner* — Erica Michelle Huebner
(74) *Attorney, Agent, or Firm* — Total Awareness Consulting Services; Robert Winslow

(57) ABSTRACT

An animal feeder may include a bottom having a curved edge and a straight edge opposite the curved edge; a front wall having a curved shape and a front height, the front wall directly connected to the curved edge; a rear wall having a flat shape and a rear height, the rear wall directly connected to the bottom, the rear height higher than the front height, the rear wall having an inside facing the front wall and an outside opposite the inside; a plurality of protrusions located on the inside of the rear wall; a first side wall connecting a first side of the front wall to a first side of the rear wall; and a second side wall connecting a second side of the front wall to a second side of the rear wall.

12 Claims, 10 Drawing Sheets

(56) References Cited

U.S. PATENT DOCUMENTS

| | | | | |
|---|---|---|---|---|
| 5,156,411 | A * | 10/1992 | Owens | B44D 3/126 |
| | | | | 280/79.5 |
| 5,458,087 | A | 10/1995 | Prior et al. | |
| D365,470 | S * | 12/1995 | Shulman | D30/129 |
| 6,173,472 | B1 * | 1/2001 | McLaughlin | A47L 13/20 |
| | | | | 15/264 |
| 6,622,884 | B1 * | 9/2003 | Gartner | B05C 17/0245 |
| | | | | 220/570 |
| 8,381,683 | B2 * | 2/2013 | Keirse | A01K 39/0125 |
| | | | | 119/53 |
| 9,038,571 | B1 * | 5/2015 | Getz | A01K 5/01 |
| | | | | 119/58 |
| D977,740 | S * | 2/2023 | Wingate | D30/129 |
| 2004/0206761 | A1 * | 10/2004 | Frantz | B44D 3/126 |
| | | | | 220/570 |
| 2005/0039690 | A1 * | 2/2005 | Sage, Jr. | A01K 5/0114 |
| | | | | 119/61.5 |
| 2005/0284383 | A1 * | 12/2005 | Fehringer | A01K 5/0291 |
| | | | | 119/51.13 |
| 2011/0017141 | A1 * | 1/2011 | Hewson | A01K 5/0114 |
| | | | | 119/51.5 |
| 2011/0114219 | A1 * | 5/2011 | Lathim | A01K 5/0114 |
| | | | | 141/311 R |
| 2016/0101646 | A1 * | 4/2016 | Kiceniuk | B44D 3/121 |
| | | | | 206/229 |
| 2020/0276859 | A1 * | 9/2020 | Lambertson, Jr. | |
| | | | | B65D 25/2832 |
| 2022/0132797 | A1 * | 5/2022 | Hardy | B65D 25/2885 |
| | | | | 220/574 |

FOREIGN PATENT DOCUMENTS

| | | | | |
|---|---|---|---|---|
| CN | 110050719 | A * | 7/2019 | |
| DE | 10143213 | C1 * | 4/2003 | A01K 5/0114 |
| GB | 2229076 | A * | 9/1990 | A01K 5/0114 |
| KR | 102100972 | B1 * | 4/2020 | B44D 3/126 |
| WO | WO-2015028794 | A2 * | 3/2015 | A01K 11/006 |

* cited by examiner

ANIMAL FEEDER

CROSS-REFERENCE TO RELATED APPLICATIONS

This application claims the benefit of U.S. Provisional Application No. 63/152,265, filed Feb. 22, 2021, which is hereby incorporated by reference in its entirety.

BACKGROUND

Many domestic animals, pets, and/or livestock may strain one or more parts of their bodies while eating out of conventional animal feeders.

Many domestic animals, pets, and/or livestock may cause conventional animal feeders to move and/or spin while eating.

Many domestic animals, pets, and/or livestock may cause food to spill out of conventional animal feeders while eating.

Accordingly, given the shortcomings of conventional feeders, a need exists for improved animal feeders.

This Background is provided to introduce a brief context for the Detailed Description that follows. This Background is not intended to be an aid in determining the scope of the claimed subject matter nor be viewed as limiting the claimed subject matter to implementations that solve any or all of the shortcomings or problems presented above.

BRIEF DESCRIPTION OF THE SEVERAL VIEWS OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EMBODIMENTS

Figure 1:
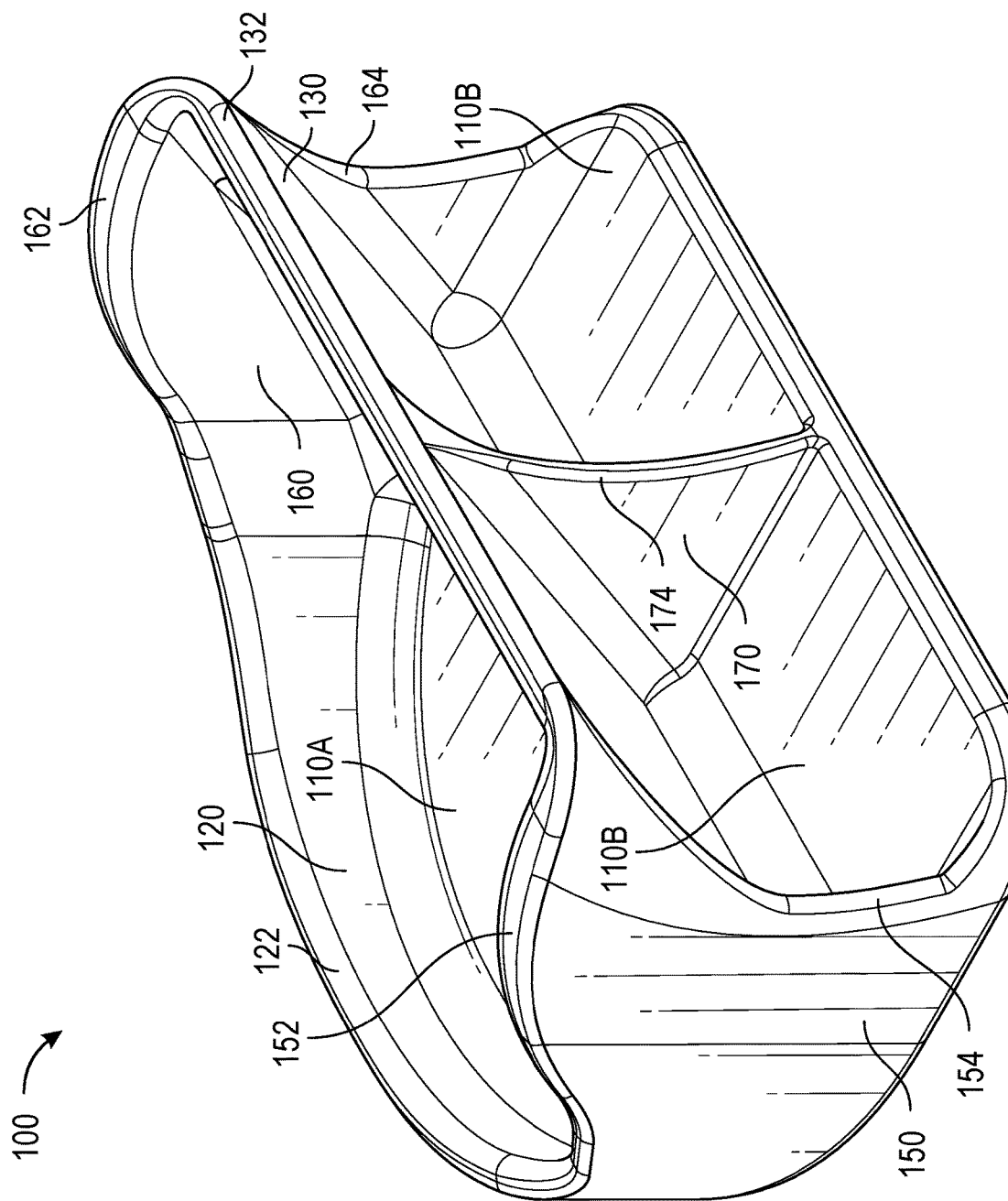
FIG. 1 is an illustration of a perspective view of an example animal feeder, consistent with disclosed embodiments.

Consistent with disclosed embodiments, animal feeders are disclosed.

The disclosed animal feeders may provide a more ergonomic eating position to at least some domestic animals, pets, and/or livestock over what is provided by conventional animal feeders. A more ergonomic eating position may enable domestic animals, pets, and/or livestock to relax while eating. This is in contrast to the often awkward, anxious, and/or aggressive manner of eating that many domestic animals, pets, and/or livestock exhibit while eating from conventional animal feeders. To accomplish a more ergonomic eating position, the disclosed animal feeders may be configured to guide the face, mouth, tongue, jaw, and/or teeth of domestic animals, pets, and/or livestock to food located in the animal feeder.

The disclosed animal feeders may be configured to remain stationary, or at least experience less movement, during eating as compared to conventional animal feeders. Many domestic animals, pets, and/or livestock may not be able to easily reach all of the food located in conventional animal feeders. This may cause many domestic animals, pets, and/or livestock to push conventional animal feeders while trying to eat. To reduce movement during eating, the disclosed animal feeders may be configured to remain against a wall, cabinet, door, and/or other fixed vertical surface(s) while domestic animals, pets, and/or livestock are eating. This is contrast to many conventional animal feeders shaped as bowls that experience movement and/or spinning during eating even when pushed up against a wall, cabinet, door, and/or other fixed vertical surface(s). For example, some animals may have physical characteristics that cause them to experience more difficulty when eating. Such animals may include, but are not limited to, flat-faced dog breeds such as Boston Terrier, Boxer, Brussels Griffon, Bulldog, Bullmastiff, Chinese Shar-Pei, Dogue de Bordeaux, English Toy Spaniel, French Bulldog, Japanese Chin, Pekingese, Pug, Shih Tzu, and any combination thereof, as well as mixed breeds including at least one of the aforementioned breeds. Other such animals may include flat-faced cat breeds such as British Shorthair, Burmilla, Exotic Shorthair, Himalayan, Munchkin Cat, Persian, Scottish Fold, Selkirk Rex, and any combination thereof, as well as mixed breeds including at least one of the aforementioned breeds. In an additional example, some animals may have a disability, such as a broken or missing limb, that cause them to experience more difficulty when eating.

The disclosed animal feeders may be configured to retain more food in the animal feeder during eating as compared to conventional animal feeders. As many domestic animals, pets, and/or livestock struggle to eat all of the food out of conventional animal feeders, food will often be pushed out of conventional animal feeders causing food to be spilled onto the surrounding environment. Some conventional animal feeders may comprise a textured surface at the bottom of a bowl shaped feeder. However, the textured surface at the bottom of a bowl shaped feeder may not eliminate food from being pushed out of the feeder while many domestic animals, pets, and/or livestock struggle to eat. To reduce and/or eliminate food being pushed out of an animal feeder during eating, the disclosed animal feeders may be configured to secure at least some food in place and/or retain food within the animal feeder while domestic animals, pets, and/or livestock are eating.

As used herein, food may comprise many types of substances with various characteristics, textures, moistness, etc. For example, food may comprise solid substances. Food may comprise liquid substances. Food may comprise a combination of solid and liquid substances. Food may comprise a slippery surface. Food may comprise large chunks. Food may comprise granules. Food may easily shear. Food may comprise a chewy texture. Food may easily compress. Food may stretch. Food may squish when being mouthed. Food may be intended for consumption by domestic animals, pets, and/or livestock.

As used herein, a first plane that is perpendicular to a second plane shall be interpreted as the first plane is 90 degrees or nearly 90 degrees to the second plane.

As used herein, a quarter round shape shall be interpreted as having a profile of a quarter of a circle with a flat or nearly flat surface on each side. As used herein, a half round shape shall be interpreted as having a profile of a half of a circle on one side and a flat or nearly flat surface on the other side.

Embodiments consistent with the present disclosure may include an animal feeder. The animal feeder may comprise a bottom. The bottom may comprise a flat surface. The bottom may comprise a surface that is predominantly flat. The bottom may comprise a curved edge. The curved edge may be considered the front edge of the bottom. The bottom may comprise a straight edge. The straight edge may be considered the rear edge of the bottom. The straight edge may be located opposite the curved edge. The animal feeder may comprise a front wall. The front wall may comprise a curved shape. The front wall may be connected to the curved edge of the bottom. The front wall has a front height. The animal feeder may comprise a rear wall. The rear wall may comprise a flat shape. The rear wall may have a shape that is predominantly flat. The rear wall may be connected to the bottom between the curved edge and the straight edge. The rear wall has a rear height. The rear height may be higher than the front height. The rear wall may comprise an inside facing the front wall. The rear wall may comprise an outside facing away from the front wall. The outside of the rear wall may be located opposite to the inside of the rear wall. The animal feeder may comprise a first side wall. The first side wall may connect a first side of the front wall to a first side of the rear wall. The animal feeder may comprise a second side wall. The second side wall may connect a second side of the front wall to a second side of the rear wall.

In some embodiments, a front wall of an animal feeder may form a semicircle. The front wall may be connected to a bottom of the animal feeder along a curved edge of the bottom.

In some embodiments, a rear wall of an animal feeder may comprise one or more protrusions. The one or more protrusions may be located on the inside of the rear wall. The one or more protrusions may be formed as part of the inside of the rear wall during manufacturing of the rear wall. The one or more protrusions may be connected to the inside of the rear wall after manufacturing the rear wall. The one or more protrusions may be configured to secure at least some food in place while a domestic animal, pet, or farm animal is eating. The one or more protrusions may be configured to prevent at least some food from being pushed up the rear wall while a domestic animal, pet, or farm animal is trying to eat the food. The one or more protrusions may be configured to guide the face, mouth, tongue, jaw, and/or teeth of domestic animals, pets, and/or livestock to the food located in the animal feeder. The one or more protrusions may comprise one or more ridges. A ridge may span the first side of the rear wall to the second side of the rear wall. A ridge may comprise a round shape with a radius of the round portion in a range of, for example, 0.04 to 1 inches. A ridge may comprise a triangular shape. A ridge may comprise a half round shape. A ridge may comprise a quarter round shape. A low distance defined as the distance between a bottom of the animal feeder and a lowest of one or more or the ridges along the inside of the rear wall may be in a range of, for example, 1 to 2 inches. A gap distance defined as the distance between a first of two or more ridges and a second of two or more ridges along the inside of the rear wall may be in a range of, for example, 1 to 1.5 inches. A high distance defined as the distance between a highest of one or more ridges and a top edge of the rear wall along the inside of the rear wall may be in a range of, for example, 2 to 4 inches. The highest of two or more ridges may, for example, be located at or near half the distance between the bottom and the top edge of the rear wall. A person having ordinary skill in the art will recognize that that these measurements are examples, and that it is anticipated that these sizes may vary with alternative embodiments. For example, an animal feeder intended for large animals such as a horses, may employ larger measurements that an animal feeder intended for small animals such as a pug.

In some embodiments, a slope angle defined as the angle between an inside of a rear wall of an animal feeder and a bottom of the animal feeder may be in a range of, for example, 120 to 150 degrees. For example, according to an embodiment of the present disclosure, the slope angle may be 135 degrees. The slope angle may be based on the size of the animal feeder. The slope angle may be based on the size of one or more animals intended to be served by the animal feeder. The slope angle may be based on the species of one or more animals intended to be served by the animal feeder. The rear wall and the slope angle of the rear wall may be collectively configured to guide the face, mouth, tongue, jaw, and/or teeth of domestic animals, pets, and/or livestock to food located in the animal feeder.

In some embodiments, a straight edge of a bottom of an animal feeder and a top edge of a rear wall of the animal feeder may be in the same vertical plane. According to one embodiment, the vertical plane may be perpendicular to the bottom of the animal feeder. For example, the animal feeder may be located in such a manner that the top edge of a rear wall may be in contact with a vertical surface. Examples of a vertical surface include a wall, a cabinet, a door, combinations thereof, and/or the like. In this location, the top edge of the rear wall and the straight edge of the bottom may both be in contact with the vertical surface. The straight edge of the bottom and the top edge of the rear wall may be configured to keep the animal feeder against a wall, cabinet, door, and/or other fixed vertical surface while a domestic animal, pet, or farm animal is eating.

In some embodiments, a bottom surface of a bottom of an animal feeder may comprise at least one non-skid material. The at least one non-skid material may be integrated with the bottom surface during manufacture of the animal feeder. The at least one non-skid material may be connected to the bottom surface after manufacture of the bottom surface. According to an example embodiment, the non-skid material may comprise rubber. According to an example embodiment, the non-skid material may comprise cork. According to an example embodiment, the non-skid material may comprise plastic. According to an example embodiment, the non-skid material may comprise a texture. The texture may be configured to hold onto a rough (or flexible) surface, such as, for example, gravel, dirt, carpet, and/or the like. The texture may be configured to increase friction between the animal feeder and a floor surface. The texture may be configured to hold onto a surface, such as, for example, wood, tile, cement, vinyl, ceramic, and/or the like.

In some embodiments, an animal feeder may comprise a support wall. The support wall may be connected to at least a portion of an outside of a rear wall and a straight edge of a bottom of the animal feeder. The support wall may be perpendicular to the rear wall. The support wall may comprise a support edge. The support edge may face away from the rear wall. The support edge may comprise a concave shape. The support wall and the rear wall may be configured to enable a human hand to lift and or move the animal feeder.

In some embodiments, a first side wall of an animal feeder may comprise a first edge having a concave shape. The first edge may face away from a front wall of the animal feeder. The first edge may be located at or near the rear of the animal feeder. The first side wall may comprise a first top edge having a convex shape. The first top edge may face away from the bottom of the animal feeder.

In some embodiments, a second side wall of an animal feeder may comprise a second edge having a concave shape. The second edge may face away from a front wall of the animal feeder. The second edge may be located at or near the rear of the animal feeder. The second side wall may comprise a second top edge having a convex shape. The second top edge may face away from the bottom of the animal feeder.

In some embodiments, a connection between a bottom of an animal feeder and at least one of a front wall, a rear wall, a first side wall, and a second side wall may be rounded in shape. A connection between a front wall of an animal feeder and at least one of a rear wall, a first side wall, and a second side wall may be rounded in shape. A connection between a rear wall of an animal feeder and at least one of a first side wall and a second side wall may be rounded in shape.

In some embodiments, an animal feeder may be configured to contain a volume of food in a range of, for example, 1 cup to 4 quarts. The size of the animal feeder may be based on a volume of food that the animal feeder is configured to contain. For example, an animal feeder configured to contain 1 cup of food may comprise a rear height in a range of, for example, 4 to 6 inches. In this example, the animal feeder may comprise a front height in a range of, for example, 1 to 2 inches. In this example, the animal feeder may comprise an overall width in a range of, for example, 7 to 9 inches. In this example, the animal feeder may comprise an overall depth in a range of, for example, 6 to 8 inches. The depth may be equivalent to a length of a bottom (i.e. a distance from a center of a curved edge of the bottom to a center of a straight edge of the bottom). The depth may be equivalent to a distance from a center of a top of a front wall to a center of a top of a rear wall. In another example, an animal feeder configured to contain 2 cups of food may comprise a rear height in a range of, for example, 4.5 to 6.5 inches. In this example, the animal feeder may comprise a front height in a range of, for example, 1.25 to 2.25 inches. In this example, the animal feeder may comprise an overall width in a range of, for example, 7.5 to 9.5 inches. In this example, the animal feeder may comprise an overall depth in a range of, for example, 7 to 9 inches. In yet another example, an animal feeder configured to contain 4 cups of food may comprise a rear height in a range of, for example, 6 to 8 inches. In this example, the animal feeder may comprise a front height in a range of, for example, 1.5 to 2.5 inches. In this example, the animal feeder may comprise an overall width in a range of, for example, 9.5 to 11.5 inches. In this example, the animal feeder may comprise an overall depth in a range of, for example, 8.5 to 10.5 inches. In a final example, an animal feeder configured to contain 4 quarts of food may comprise a rear height in a range of, for example, 15 to 18 inches. In this example, the animal feeder may comprise a front height in a range of, for example, 5 to 7 inches. In this example, the animal feeder may comprise an overall width in a range of, for example, 22 to 28 inches. In this example, the animal feeder may comprise an overall depth in a range of, for example, 17 to 20 inches. In some embodiments, the volume of food may be based on the size of one or more animals intended to be served by the animal feeder. The volume of food may be based on the species of one or more animals intended to be served by the animal feeder. The volume of food may be based on one or more breeds of one or more animals intended to be served by the animal feeder.

In some embodiments, an animal feeder may comprise at least one non-toxic material. The at least one non-toxic material may comprise plastic. The at least one non-toxic material may comprise stainless steel. The at least one non-toxic material may comprise one or more varieties of wood. At least some of the wood may be sealed. At least some of the wood may be sealed with a non-toxic sealer.

In some embodiments, a plurality of animal feeders may be connected together. For example, a rear edge of a first of the plurality of animal feeders may be connected to a rear edge of a second of the plurality of animal feeders. In another example, a first side wall of a first of the plurality of animal feeders may be connected to a second side wall of a second of the plurality of animal feeders. The first side wall of the second of the plurality of animal feeders may be connected to a second side wall of a third of the plurality of animal feeders and so on. In yet another example, a first of the plurality of animal feeders may share a side wall with a second of the plurality of animal feeders. The second of the plurality of animal feeders may share a side wall with a third of the plurality of animal feeders and so on. A plurality of animal feeders connected together may be configured to simultaneously feed a plurality of domestic animals, pets, livestock, or any combination thereof.

In some embodiments, an animal feeder may be elevated. The animal feeder may be elevated to enable taller domestic animals, pets, and/or livestock to relax while eating.

In some embodiments, an animal feeder may be configured to be attached. The animal feeder may be configured to be attached to a horizontal surface. The animal feeder may be configured to be attached to a vertical surface.

Reference will now be made in detail to example embodiments illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the features, materials, and examples are illustrative only and are not intended to be necessarily limiting.

FIG. 1 is an illustration of a perspective view of an example animal feeder 100, consistent with disclosed embodiments. Animal feeder 100 may comprise a bottom (110A and 110B). Animal feeder 100 may comprise a front wall 120 having a top edge 122. Animal feeder 100 may comprise a rear wall 130 having a top edge 132. Top edge 122 of front wall 120 has a front height. Top edge 132 of rear wall 130 has a rear height. The rear height may be higher than the front height, as shown. Animal feeder 100 may comprise a first side wall 150 having a first edge 154. First edge 154 may comprise a concave shape, as shown. First side wall 150 may have a first top edge 152. First top edge 152 may have a convex shape, as shown. Animal feeder 100 may comprise a second side wall 160 having a second edge 164. Second edge 164 may comprise a concave shape, as shown. Second side wall 160 may have a second top edge 162. Second top edge 162 may have a convex shape, as shown. Animal feeder 100 may comprise a support wall 170. Support wall 170 may be connected to rear wall 130 and bottom 110B, as shown. Support wall 170 may be perpendicular to rear wall 130, as shown. Support wall 170 may have a support edge 174. Support edge 174 may have a concave shape, as shown.

Figure 2:
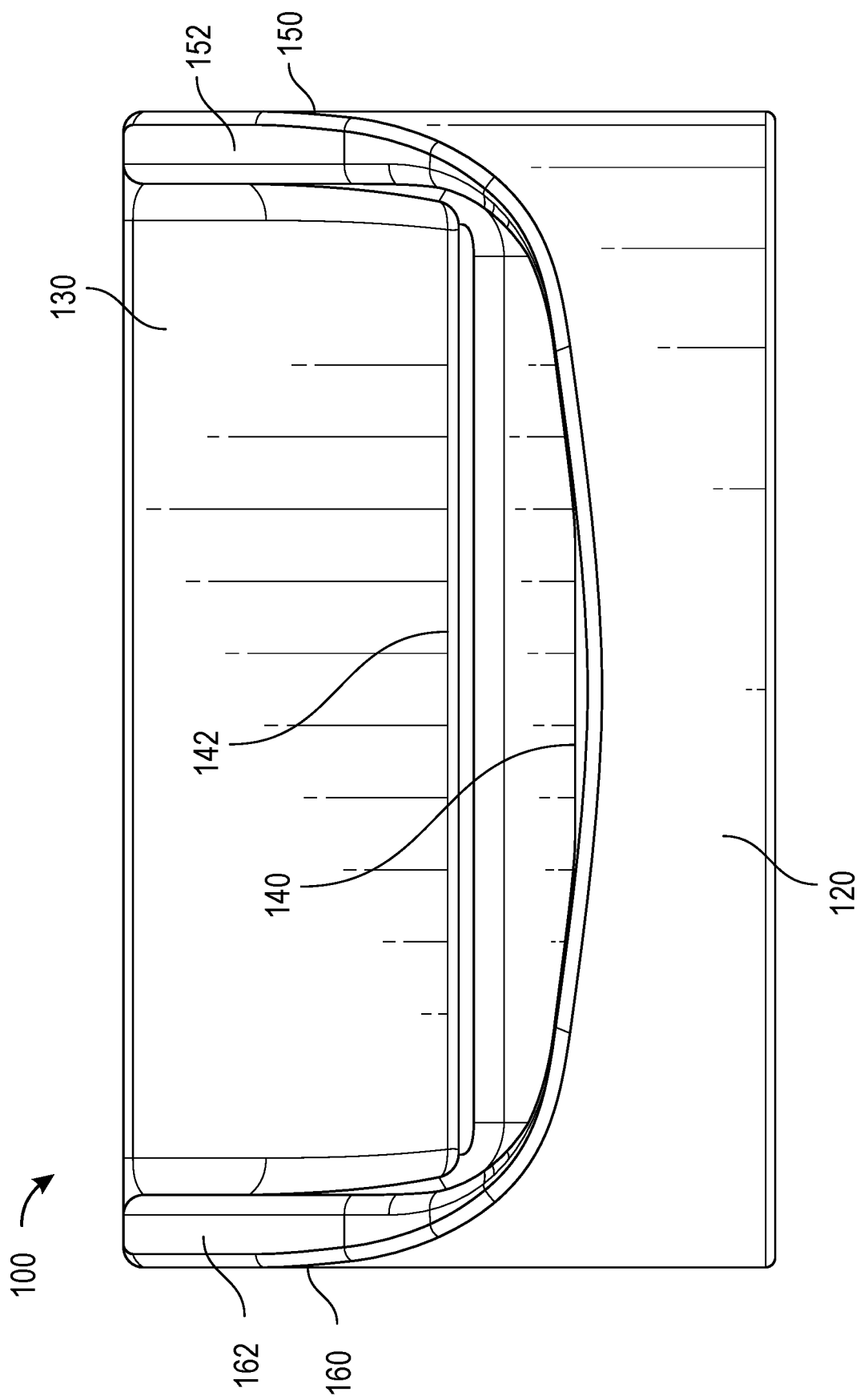
FIG. 2 is an illustration of a front view of an example animal feeder, consistent with disclosed embodiments.

FIG. 2 is an illustration of a front view of an example animal feeder 100, consistent with disclosed embodiments. Animal feeder 100 may comprise a front wall 120. Animal feeder 100 may comprise a rear wall 130. Animal feeder 100 may comprise one or more protrusions (140 and 142) located on the inside of rear wall 130, as shown. One or more protrusions (140 and 142) may comprise one or more ridges that span a first side of rear wall 130 to a second side of rear wall 130, as shown. Animal feeder 100 may comprise a first side wall 150 having a first top edge 152. Animal feeder 100 may comprise a second side wall 160 having a second top edge 162.

Figure 3:
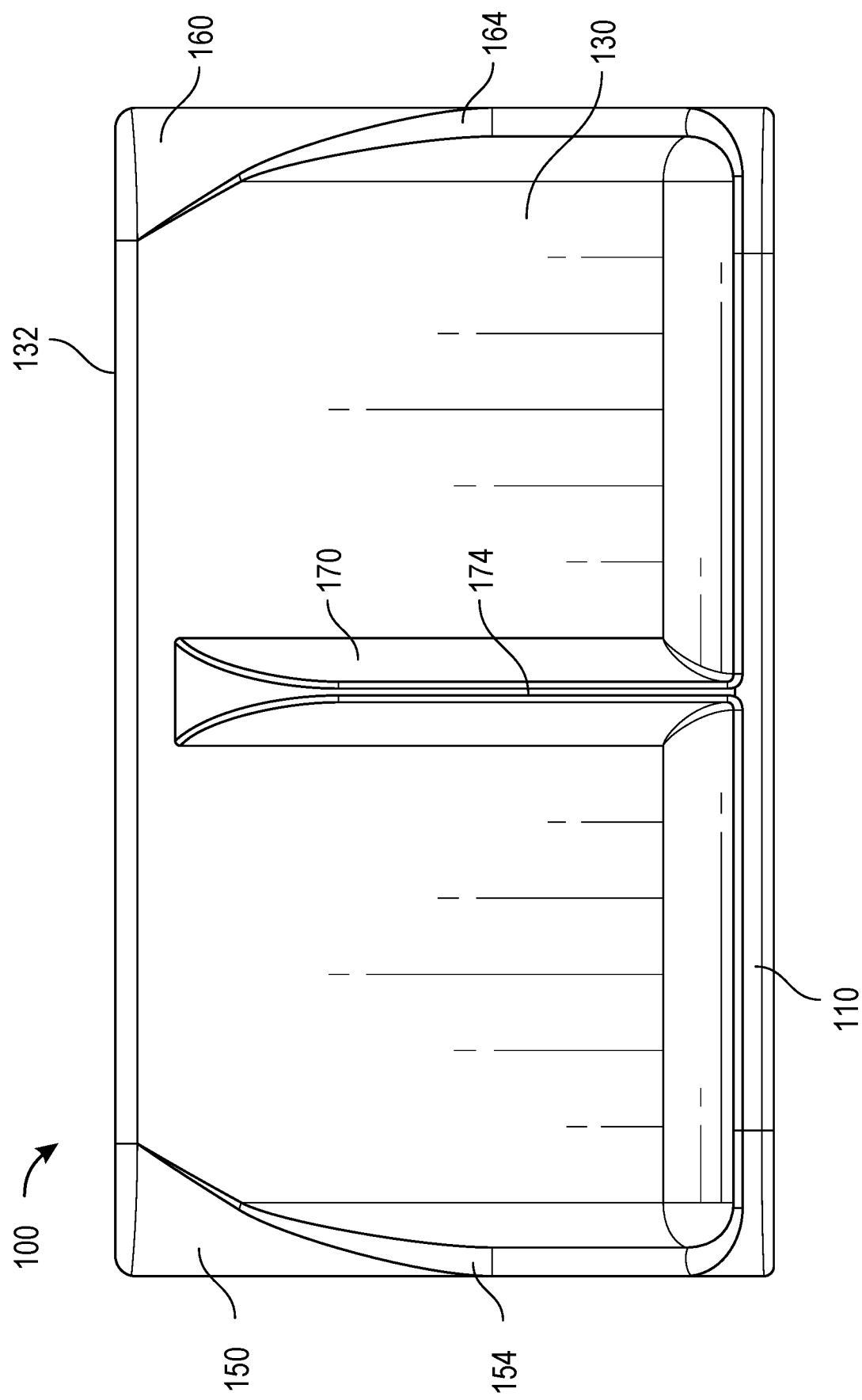
FIG. 3 is an illustration of a rear view of an example animal feeder, consistent with disclosed embodiments.

FIG. 3 is an illustration of a rear view of an example animal feeder 100, consistent with disclosed embodiments. Animal feeder 100 may comprise a bottom 110. Animal feeder 100 may comprise a rear wall 130 having a top edge 132. Animal feeder 100 may comprise a first side wall 150 having a first edge 154. Animal feeder 100 may comprise a second side wall 160 having a second edge 164. Animal feeder 100 may comprise a support wall 170. Support wall 170 may have a support edge 174.

Figure 4:
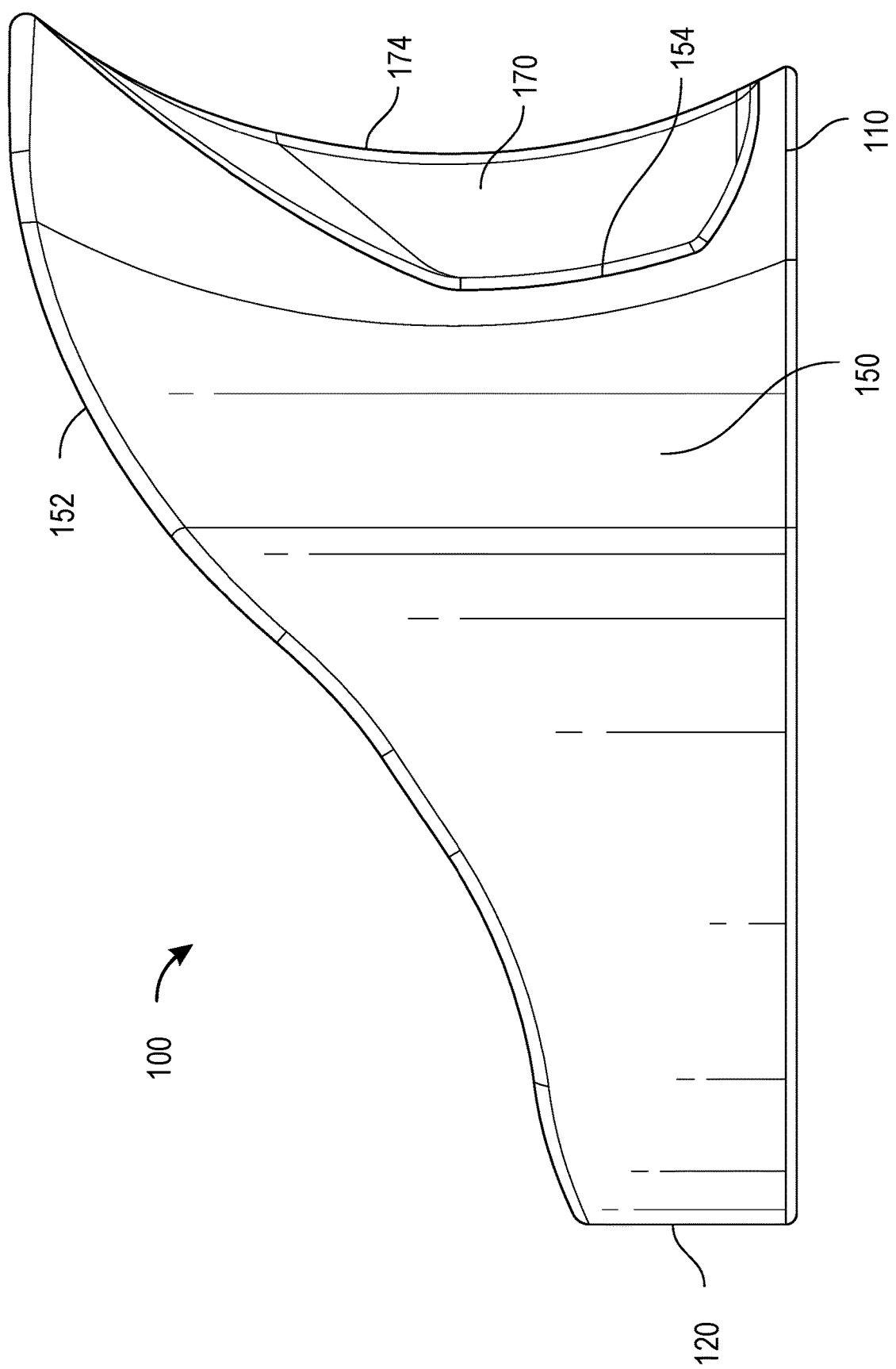
FIG. 4 is an illustration of a right side view of an example animal feeder, consistent with disclosed embodiments.

FIG. 4 is an illustration of a right side view of an example animal feeder 100, consistent with disclosed embodiments. Animal feeder 100 may comprise a bottom 110. Animal feeder 100 may comprise a front wall 120. Animal feeder 100 may comprise a first side wall 150 having a first edge 154. First edge 154 may comprise a concave shape, as shown. First side wall 150 may have a first top edge 152. First top edge 152 may have a convex shape, as shown. Animal feeder 100 may comprise a support wall 170. Support wall 170 may have a support edge 174.

Figure 5:
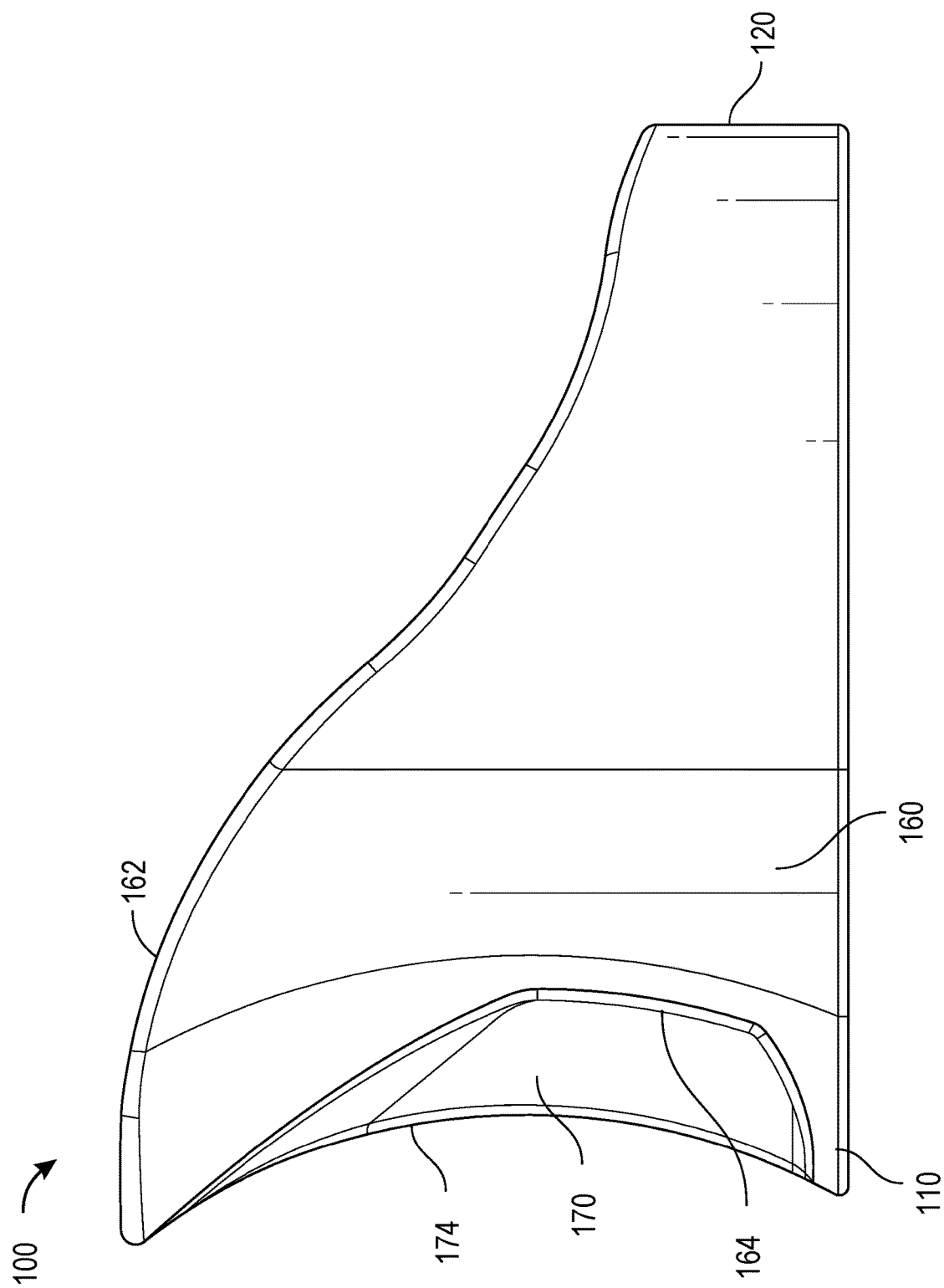
FIG. 5 is an illustration of a left side view of an example animal feeder, consistent with disclosed embodiments.

FIG. 5 is an illustration of a left side view of an example animal feeder 100, consistent with disclosed embodiments. Animal feeder 100 may comprise a bottom 110. Animal feeder 100 may comprise a front wall 120. Animal feeder 100 may comprise a second side wall 160 having a second edge 164. Second edge 164 may comprise a concave shape, as shown. Second side wall 160 may have a second top edge 162. Second top edge 162 may have a convex shape, as shown. Animal feeder 100 may comprise a support wall 170. Support wall 170 may have a support edge 174.

Figure 6:
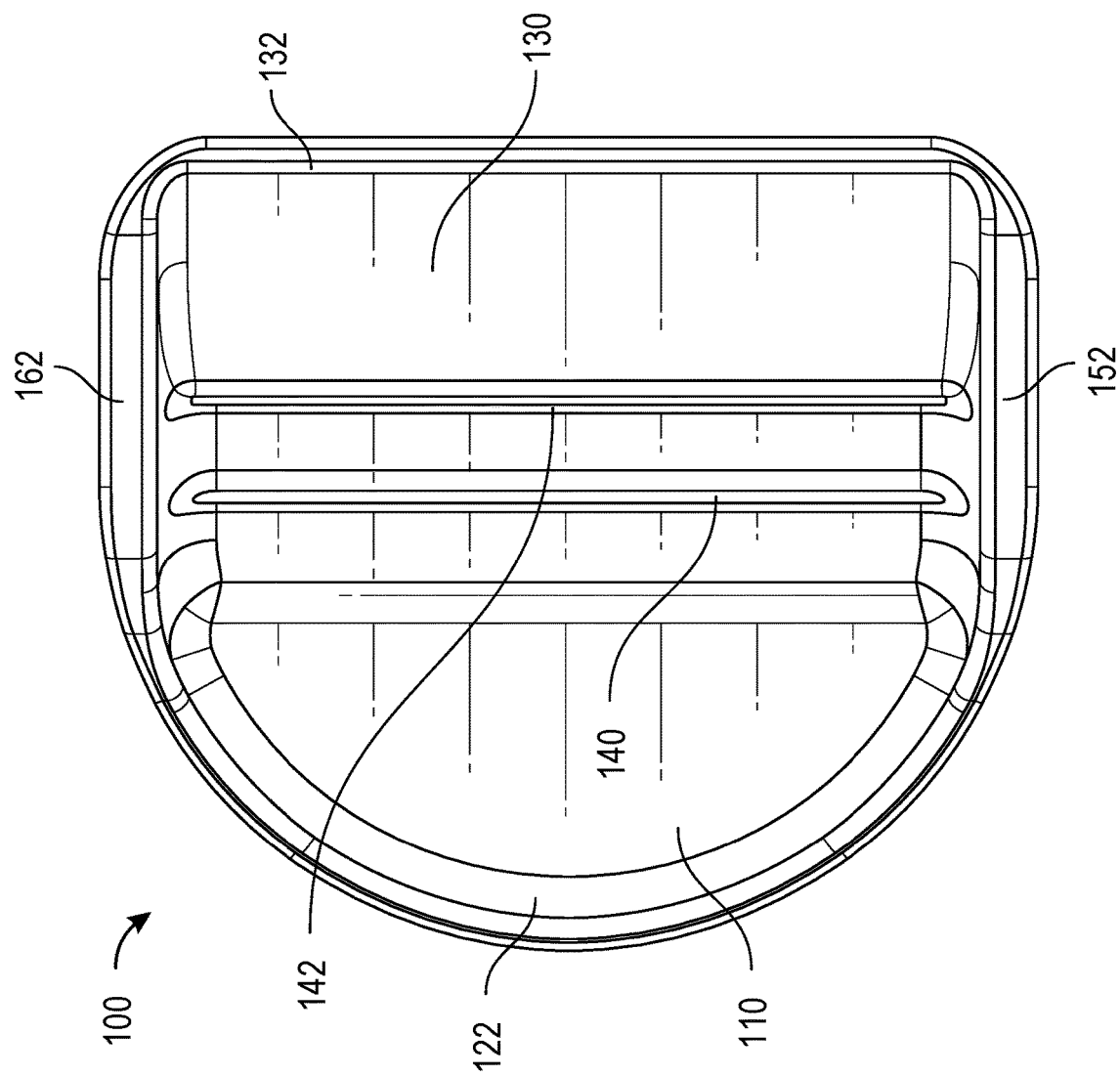
FIG. 6 is an illustration of a top view of an example animal feeder, consistent with disclosed embodiments.

FIG. 6 is an illustration of a top view of an example animal feeder 100, consistent with disclosed embodiments. Animal feeder 100 may comprise a bottom 110. Animal feeder 100 may comprise a front wall having a top edge 122. Animal feeder 100 may comprise a rear wall 130 having a top edge 132. Animal feeder 100 may comprise one or more protrusions (140 and 142) located on the inside of rear wall 130, as shown. One or more protrusions (140 and 142) may comprise one or more ridges that span a first side of rear wall 130 to a second side of rear wall 130, as shown. Animal feeder 100 may comprise a first side wall having a first top edge 152. Animal feeder 100 may comprise a second side wall having a second top edge 162.

Figure 7:
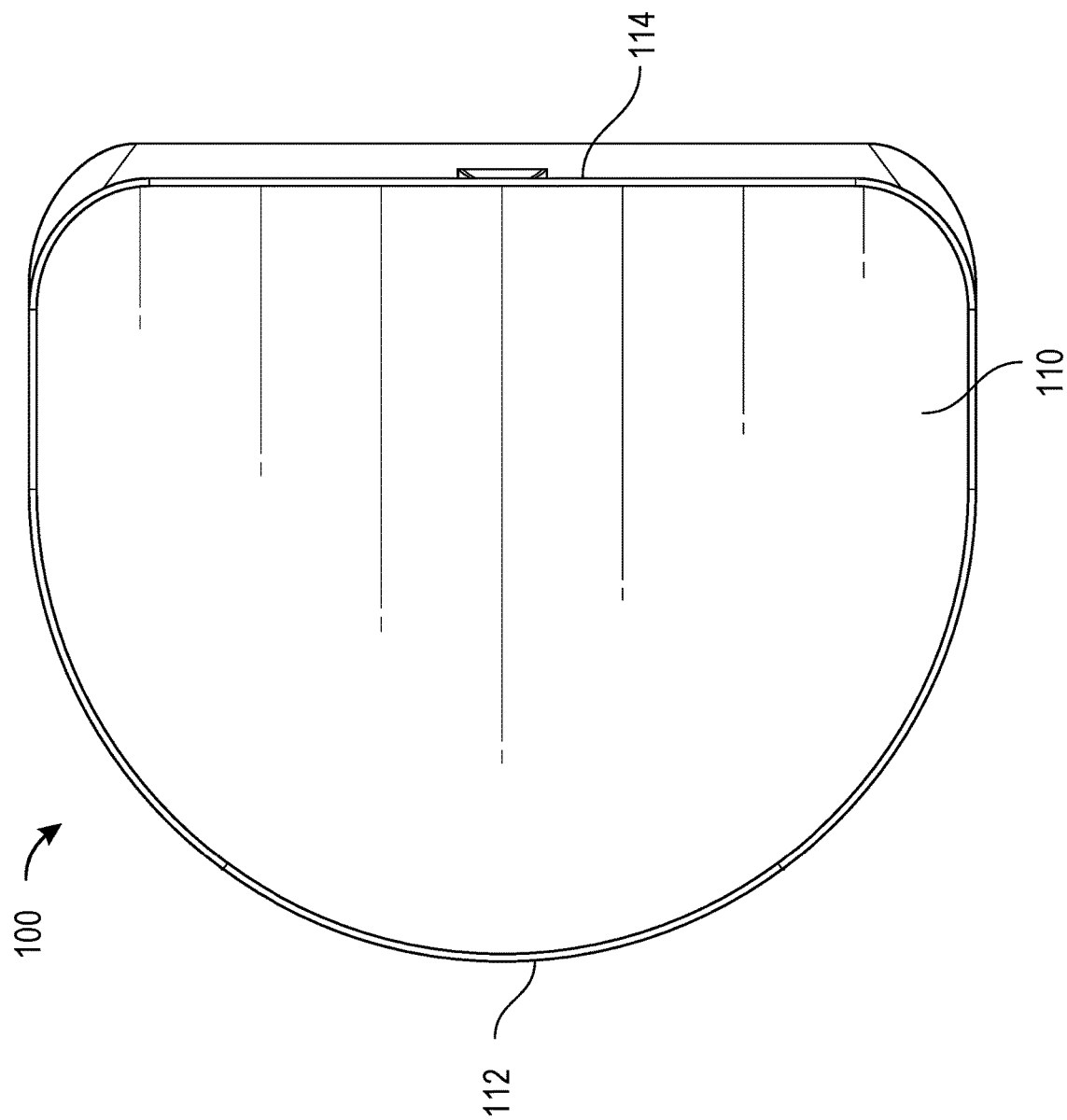
FIG. 7 is an illustration of a bottom view of an example animal feeder, consistent with disclosed embodiments.

FIG. 7 is an illustration of a bottom view of an example animal feeder 100, consistent with disclosed embodiments. Animal feeder 100 may comprise a bottom 110. Bottom 110 may comprise a flat surface. Bottom 110 may comprise a curved edge 112. Bottom 110 may comprise a straight edge 114. Straight edge 114 may be opposite curved edge 112, as shown.

Figure 8:
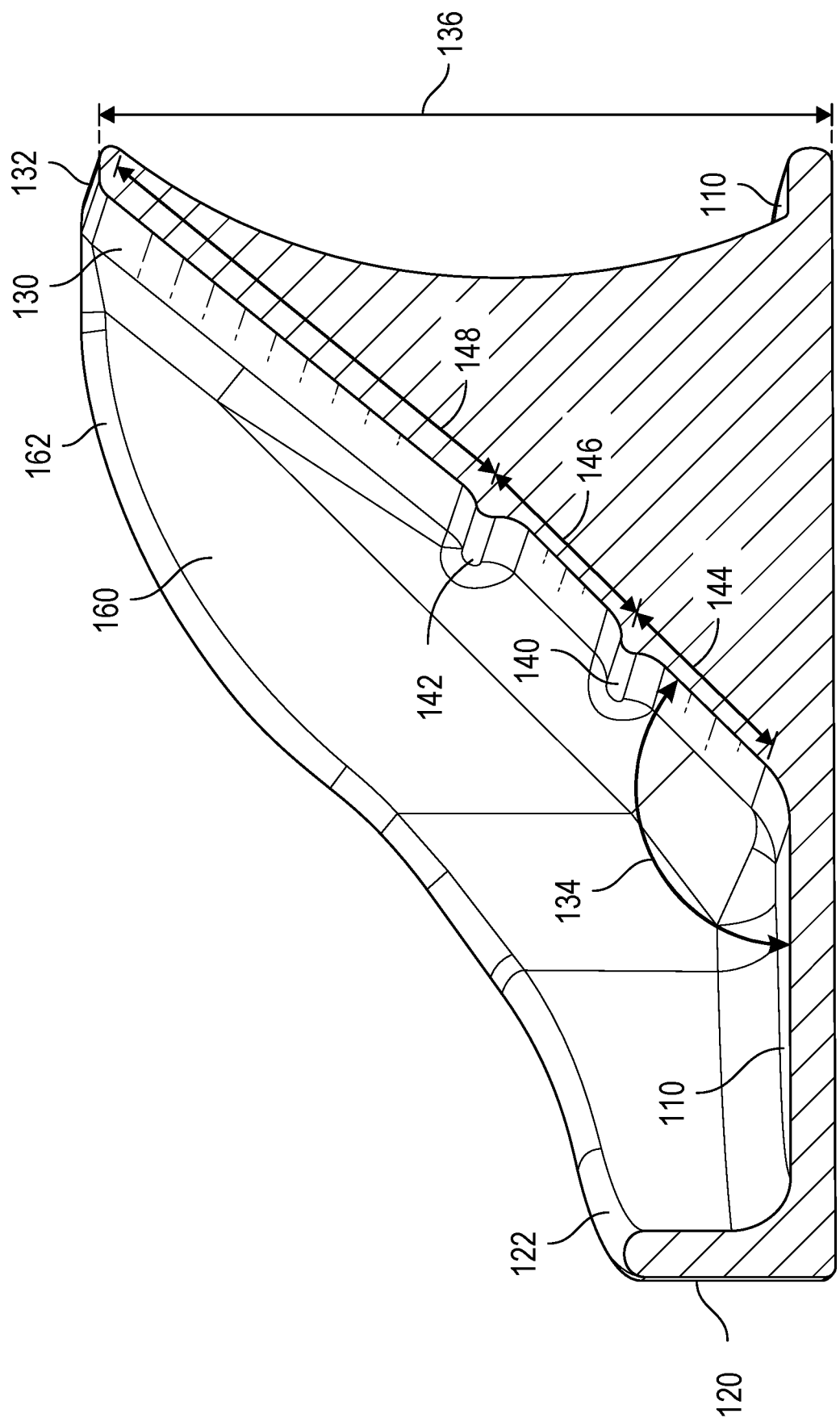
FIG. 8 is an illustration of a right side cross-sectional view of an example animal feeder, consistent with disclosed embodiments.

FIG. 8 is an illustration of a right side cross-sectional view of an example animal feeder 100, consistent with disclosed embodiments. Animal feeder 100 may comprise a bottom 110. Animal feeder 100 may comprise a front wall 120 having a top edge 122. Animal feeder 100 may comprise a rear wall 130 having a top edge 132. A straight edge (e.g. 114) of bottom 110 and top edge 132 may be in the same vertical plane 136, as shown. Vertical plane 136 may be 90 degrees with respect to bottom 110, as shown. Slope angle 134 may comprise an angle between the inside of rear wall 130 and bottom 110, as shown. Slope angle 134 may be in a range of, for example, 120 to 150 degrees. Slope angle 134 may, for example, comprise 135 degrees. Animal feeder 100 may comprise one or more protrusions (140 and 142) located on the inside of rear wall 130, as shown. One or more protrusions (140 and 142) may comprise one or more ridges, as shown. Each of one or more ridges may comprise a round shape, as shown. Low distance 144 may comprise the distance between bottom 110 and a lowest of one or more ridges (e.g. 140) along the inside of rear wall 130, as shown. Low distance 144 may be in a range of, for example, 1 to 2 inches. Gap distance 146 may comprise the distance between a first of two or more ridges (e.g. 140) and a second of two or more ridges (e.g. 142), as shown. Gap distance 146 may be in a range of, for example, 1 to 1.5 inches. High distance 148 may comprise the distance between a highest of one or more ridges (e.g. 142) and top edge 132 along the inside of rear wall 130, as shown. High distance 148 may be in a range of, for example, 2 to 4 inches. Animal feeder 100 may comprise a second side wall 160 having a second top edge 162.

Figure 9:
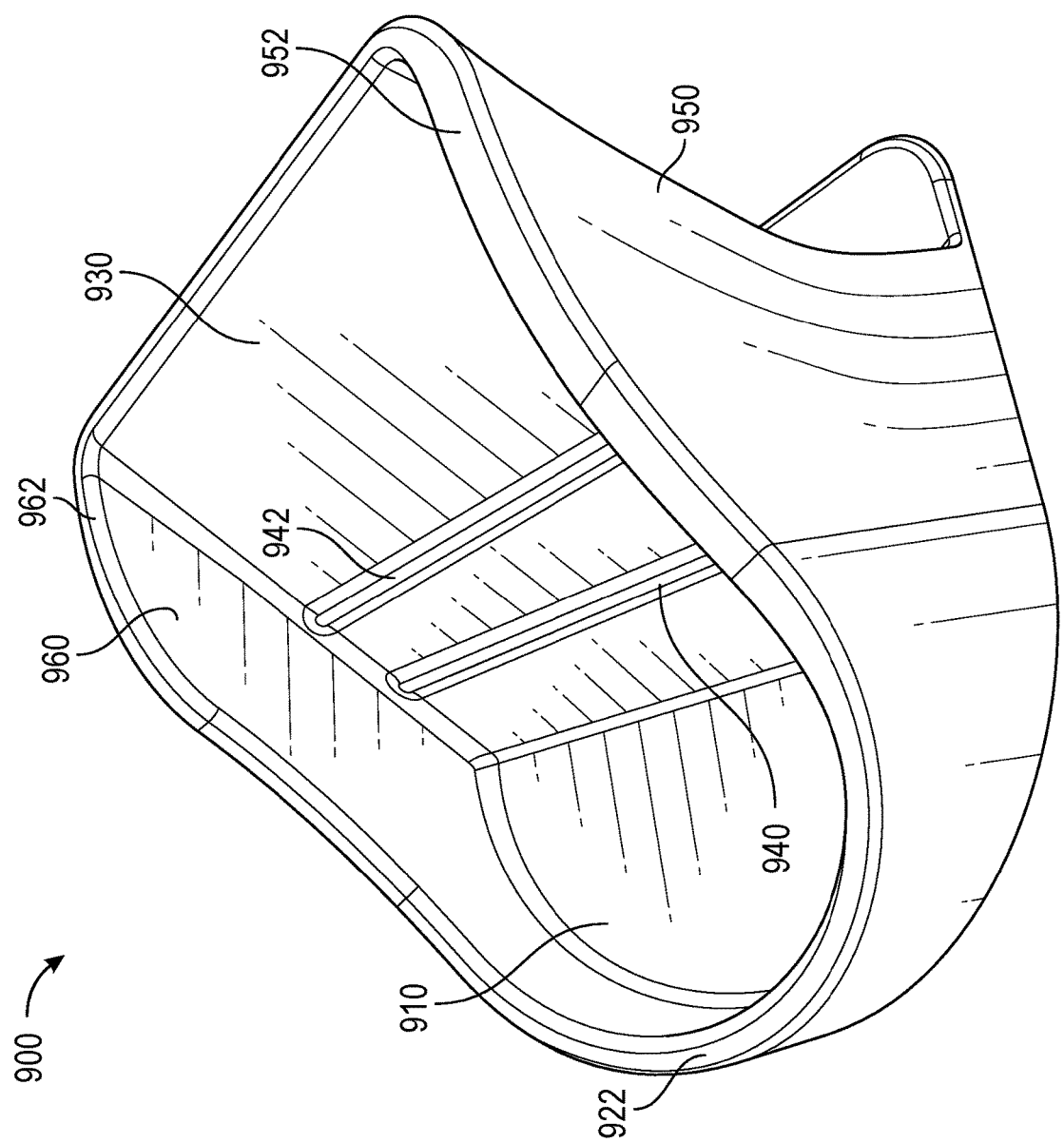
FIG. 9 is an illustration of a first example animal feeder, consistent with disclosed embodiments.

FIG. 9 is an illustration of a first example animal feeder 900, consistent with disclosed embodiments. Animal feeder 900 may comprise a bottom 910. Animal feeder 900 may comprise a front wall having a top edge 922. Animal feeder 900 may comprise a rear wall 930. Animal feeder 900 may comprise one or more protrusions (940 and 942) located on the inside of rear wall 930, as shown. One or more protrusions (940 and 942) may comprise one or more ridges, as shown. The one or more ridges may comprise a round shape, as shown. Animal feeder 900 may comprise a first side wall 950 having a first top edge 952. Animal feeder 900 may comprise a second side wall 960 having a second top edge 962. Animal feeder 900 may comprise plastic.

Figure 10:
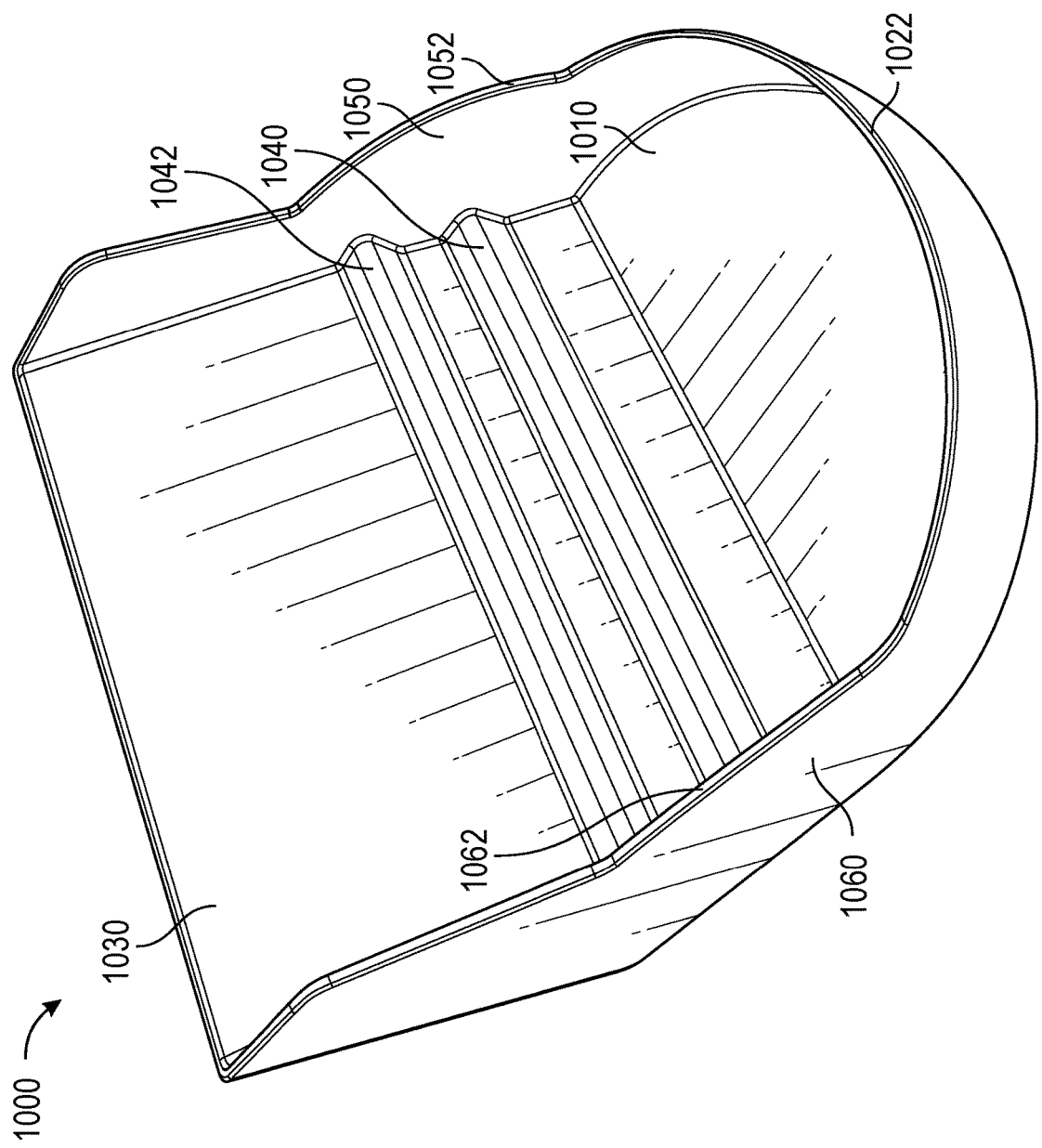
FIG. 10 is an illustration of a second example animal feeder, consistent with disclosed embodiments.

FIG. 10 is an illustration of a second example animal feeder 1000, consistent with disclosed embodiments. Animal feeder 1000 may comprise a bottom 1010. Animal feeder 1000 may comprise a front wall having a top edge 1022. Animal feeder 1000 may comprise a rear wall 1030. Animal feeder 1000 may comprise one or more protrusions (1040 and 1042) located on the inside of rear wall 1030, as shown. One or more protrusions (1040 and 1042) may comprise one or more ridges, as shown. The one or more ridges may comprise a triangular shape, as shown. Animal feeder 1000 may comprise a first side wall 1050 having a first top edge 1052. Animal feeder 1000 may comprise a second side wall 1060 having a second top edge 1062. Animal feeder 1000 may comprise stainless steel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments.

In this specification, various embodiments are disclosed. Limitations, features, and/or elements from the disclosed example embodiments may be combined to create further embodiments within the scope of the disclosure. Moreover, the scope includes any and all embodiments having equivalent features, elements, modifications, omissions, adaptations, or alterations based on the present disclosure. Further, aspects of the disclosed methods can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that shown.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, an apparatus described as having three optional features may be embodied in seven different ways, namely with just one of the three possible features, with any two of the three possible features or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An animal feeder comprising:
   a) a feed containing portion, the feed containing portion having a bottom surface defining a lowermost single plane of the feed containing portion, the bottom surface having a curved edge and a straight edge opposite the curved edge;
   b) a front wall having a curved shape and a front height, the front wall directly connected to the curved edge;
   c) a rear wall having a rear height, a first portion of the rear wall having a flat surface and defining a single second plane, the first portion of the rear wall directly connected to the bottom surface, the rear height higher than the front height, the rear wall having:
      i) an inside facing the front wall; and
      ii) an outside opposite the inside;
   d) a plurality of protrusions located on the inside of the rear wall, at least one of the protrusions providing an abrupt change from the flat surface of the first portion of the rear wall;
   e) a first side wall connecting a first side of the front wall to a first side of the rear wall; and
   f) a second side wall connecting a second side of the front wall to a second side of the rear wall.

2. The animal feeder according to claim 1, wherein the front wall forms a semicircle.

3. The animal feeder according to claim 1, wherein a slope angle between the first portion of the rear wall and the bottom surface is in a range of 120 to 150 degrees.

4. The animal feeder according to claim 1, wherein the protrusions comprise a plurality of ridges that span the first side of the rear wall to the second side of the rear wall.

5. The animal feeder according to claim 4, wherein each of the ridges comprises a round shape with a radius in a range of 0.04 to 1 inches.

6. The animal feeder according to claim 4, wherein a low distance between the bottom surface and a lowest of the ridges along the inside of the rear wall is in a range of 1 to 2 inches.

7. The animal feeder according to claim 4, wherein a gap distance between a first of the ridges and a second of the ridges is in a range of 1 to 1.5 inches.

8. The animal feeder according to claim 1, wherein the first side wall comprises a first top edge having a convex shape.

9. The animal feeder according to claim 1, wherein the second side wall comprises a second top edge having a convex shape.

10. The animal feeder according to claim 1, configured to contain a volume of food in a range of 1 cup to 4 quarts.

11. The animal feeder according to claim 1, wherein the rear height is in a range of 4.5 to 6.5 inches.

12. The animal feeder according to claim 1, wherein the front height is in a range of 1.25 to 2.25 inches.

* * * * *